Jan. 24, 1928.
C. K. HOLT
SWIVEL HOOK
Filed May 12, 1926
1,657,260
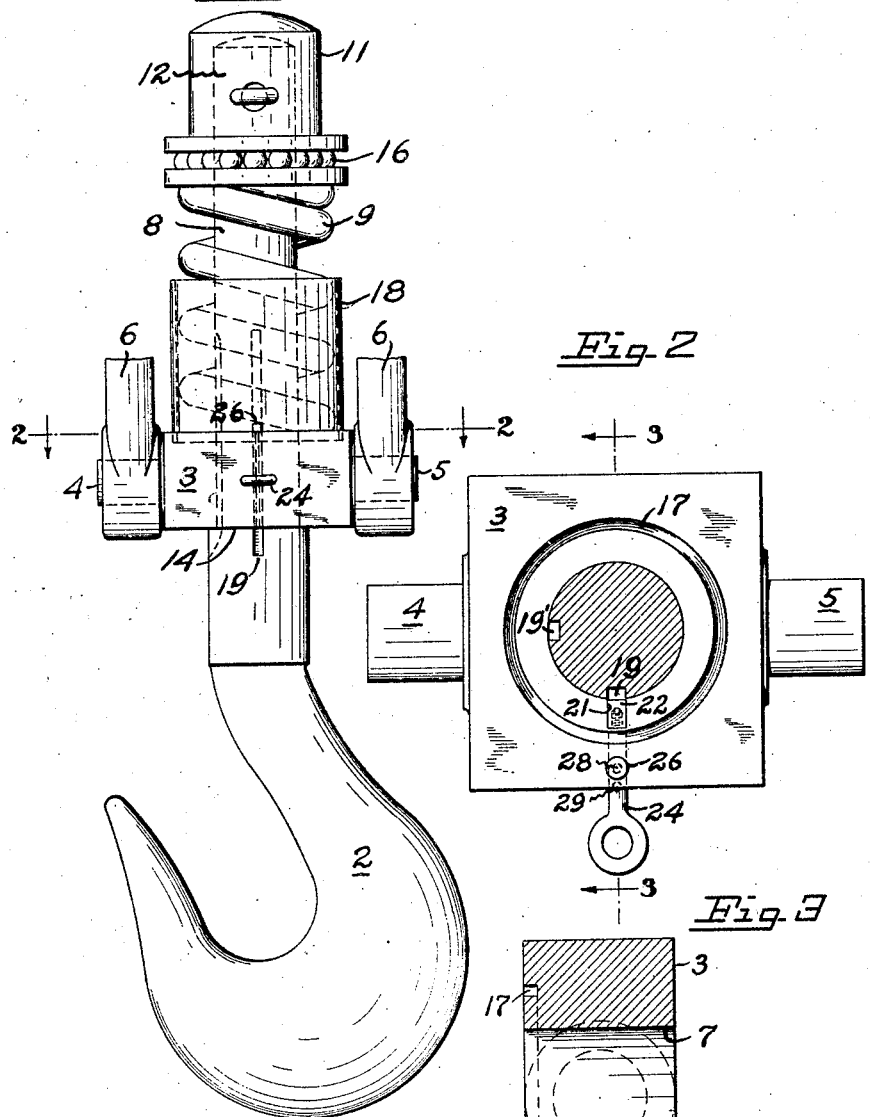
INVENTOR
CHARLES K. HOLT
BY Charles S. Evans
HIS ATTORNEY.

Patented Jan. 24, 1928.

1,657,260

UNITED STATES PATENT OFFICE.

CHARLES K. HOLT, OF TAFT, CALIFORNIA.

SWIVEL HOOK.

Application filed May 12, 1926. Serial No. 108,461.

My invention relates to an improved swivel hook of the type commonly used on an oil well derrick for handling drilling machinery, pump casings and the like.

In certain of the uses to which these derricks are put it is necessary that the objects being handled be supported so that they may be rotated into position when being lowered. In other uses it is necessary that the support be resistant to any rotative tendencies so that the travelling block and lines can not turn or twist as for example, when a well is being spudded in, or drilling is being carried on at a shallow depth. It is therefore an object of my invention to provide a swivel hook which is capable either of permitting or resisting any rotative tendency.

It is an object of my invention to provide a swivel hook which is universally applicable to the several uses to which such devices may be put in an oil well.

Another object of my invention is to provide means for fixing the hook in different positions of adjustment on the supporting means.

Further objects of my invention deal with provision of a device of ingenious simplicity and rugged construction, and one in which adjustment may be readily accomplished.

Referring to the drawings:

Figure 1 is a front elevation of my device the suspending means being shown in part.

Figure 2 is a sectional view on an enlarged scale and showing the trunnion block in plan unconnected to the suspending means. The plane of section is indicated by the line 2—2 of Figure 1.

Figure 3 is a vertical sectional view of the block; the plane of section being indicated by the line 3—3 in Figure 2.

In terms of broad inclusion my device comprises a swivel hook, the shank of which is journaled for slidable and rotative movement in a trunnion block which supports it. The shank is resiliently mounted on this support so that a certain amount of sliding movement relative thereto may take place; and means are provided, by adjustment of which, the shank may be locked against rotation in the supporting block.

In terms of greater detail my invention comprises a hook 2, of the type customarily embodied in hoists and a supporting block 3 for the hook. The block has lugs or trunnions 4 and 5 extending from its opposite sides, and adapting it for attachment to the suspending means 6 forming part of the hoisting machinery for which the hook is designed. This supporting block 3 is provided with a bore 7 in which the cylindrical shank 8 of the hook 2 is slidably and rotatably journaled.

Means are provided to resiliently resist axial sliding movement of the hook in its support, in order to transmit and cushion the stresses between the hook and hoisting machinery. A heavy coil spring 9 surrounds the end of the shank 8 above the block 3, and a nut 11 screwed onto the threaded end 12 of the shank, retains the assembly in position. A shoulder 14 is formed on the shank below the supporting block, and the block abuts against this shoulder when there is no load on the hook.

A roller thrust bearing 16 is interposed between the spring 9 and the nut 11 to promote freedom of rotation between the shank and the block regardless of the load on the hook, and an annular groove 17 in the upper surface of the block, accommodates a short piece of pipe 18 on which the roller bearing rests when the coil spring is fully compressed, thus carrying the load and preventing breakage of the spring.

The structure so far set forth is especially adapted to the handling of objects which need to be rotated into alignment and position. It is, however, frequently necessary to support devices which exert a torsional reaction on the hook, and it is not expedient to provide a separate hook for this purpose. A most important feature of my invention therefore, is the combination with the rotatable mount just explained, of a locking means which makes my device universally adaptable to the peculiar combination of problems which occur in oil well construction.

Such locking means are provided for preventing relative rotation between the hook 2 and the block. A keyway 19 is formed in the shank 8, preferably in a plane at right angles to the plane of the hook, and extends longitudinally from the shoulder 14 to a point well above the upper limit of axial sliding movement of the trunnion block 3. A cooperating, but considerably deeper keyway 21 is formed in the block 3, and a key or spline 22 of height greater than the depth of keyway 19 in the shank and less than that of the deep keyway 21 in the block, may be seated solely in the latter keyway. Guide pins 23 project radially of the bore 7 of the support from the bottom of the keyway 21 in it. Cooperating holes are drilled in the key 22 so that it may be slidably extended on these pins partially out of the keyway 21 in the block and into the keyway 19 in the shank to prevent relative rotation between the two.

An eyebolt 24 is screwed into the key and projects out thru a hole in the side of the block; providing means by which the key may readily be extended to prevent rotation of the hook, or retracted to permit its rotation. A vertical hole perpendicular to the eyebolt, accommodates a lock pin 26, for which spaced holes 28 and 29 are drilled in the eyebolt. The parts are herein illustrated in position to permit rotation of the hook. When it is desired to prevent its rotation, the pin 26 will be withdrawn, the eyebolt pushed in to cause the key to engage the keyway in the shank, and then the pin will be released and allowed to drop into the locking hole 29 in the eyebolt. In order that the hook may be fixed in whichever direction is most expedient, a second keyway 19' exactly similar to keyway 19, is formed at 90° to it in the cylindrical surface of the shank 8, so that it lies preferably in the plane of the hook 2.

It is recognized that other and substantially equivalent details may be substituted for those herein specifically illustrated, and though certain features of my invention reside in the improved construction I have evolved, I desire not to be limited solely to this preferred showing beyond those limitations set up in the accompanying claims.

I claim:

1. In a swivel hook having a shank, a supporting block in which said shank is rotatably and slidably mounted, adjustable locking means for optionally permitting or preventing rotation of the shank in the block while permitting sliding movement of the shank in the block, means for securing said locking means in either of its adjusted positions, and resilient means for resisting said sliding movement.

2. In a swivel hook having a shank and a keyway in said shank, a supporting block in which said shank is mounted and having a keyway formed therein, a key adapted to be solely in one of said keyways to permit rotation of the shank in the block, adjusting means connected to said key for moving it partially out of the one keyway and into the other keyway to prevent rotation of the shank in the block, and means for locking the key in either of its adjusted positions.

3. In a swivel hook having a shank and at least one keyway in said shank, a supporting trunnion block in which said shank is rotatably and slidably mounted and a keyway formed in said block, a key adapted to be seated solely in one of said keyways to permit rotation of the shank in the block, radially extending guideways in one keyway, adjusting means for moving said key along said guideways partially out of the one keyway and into another keyway to prevent rotation of the shank in the block, means for locking the key in adjusted position, and resilient means for resisting sliding movement of the shank in the block.

In testimony whereof, I have hereunto set my hand.

CHARLES K. HOLT.